UNITED STATES PATENT OFFICE.

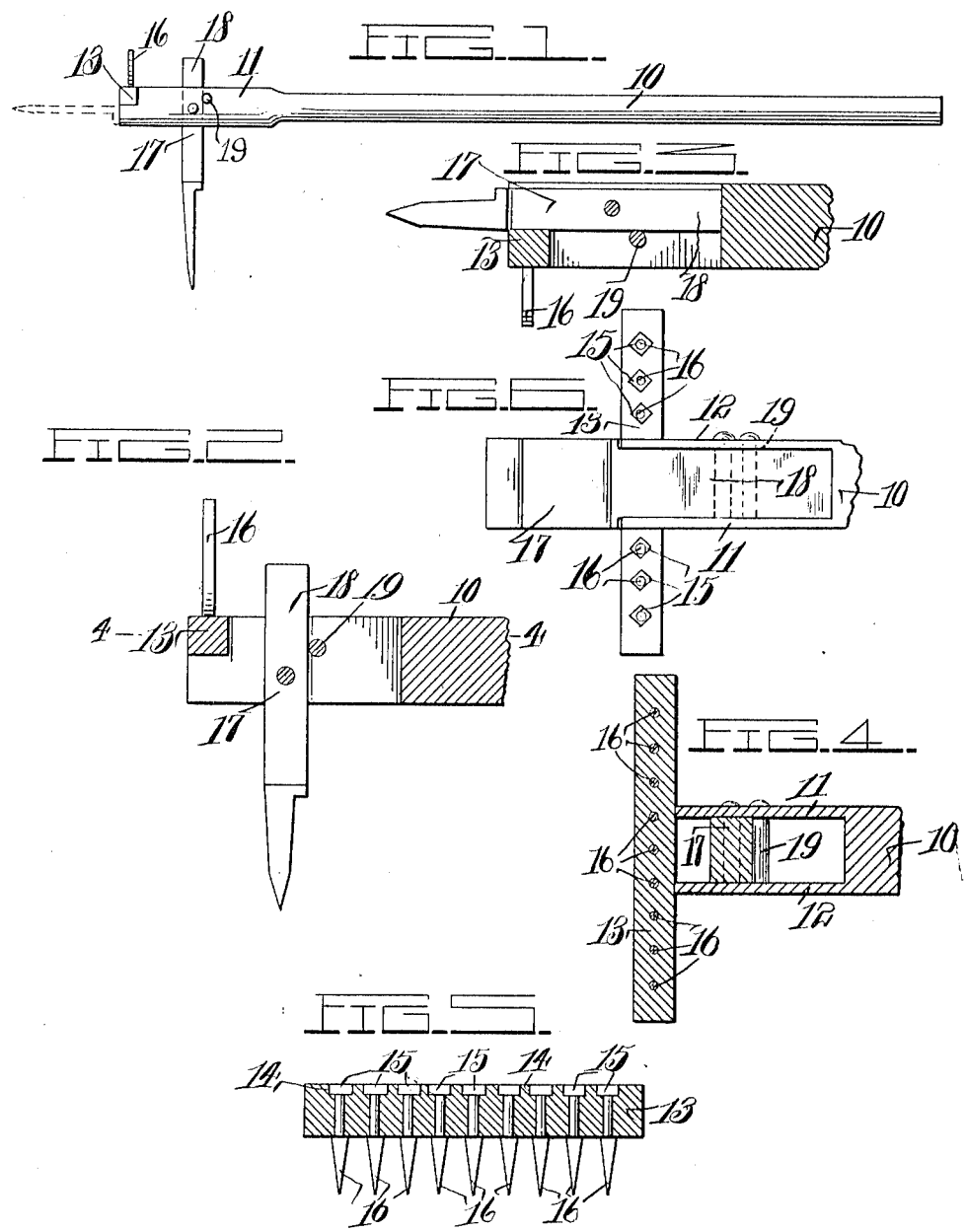

ROY E. DAVISON, OF CATOOSA, OKLAHOMA.

AGRICULTURAL IMPLEMENT.

1,079,114.   Specification of Letters Patent.   Patented Nov. 18, 1913.

Application filed October 4, 1910. Serial No. 585,273.

*To all whom it may concern:*

Be it known that I, ROY E. DAVISON, a citizen of the United States, residing at Catoosa, in the county of Rogers, State of Oklahoma, have invented certain new and useful Improvements in Agricultural Implements; and I do hereby declare the following to be a full, clear, and exact description of the invention, such as will enable others skilled in the art to which it appertains to make and use the same.

This invention relates to agricultural implements.

The object of the invention resides in the provision of an implement which may be adjusted to serve either as a hoe or a spade and which in addition may be utilized as a rake when serving either the function of a hoe or a spade.

A further object of the invention resides in the provision of an implement of the character named which will be simple in construction, efficient in use, strong and durable and which may be manufactured at a comparatively small cost.

With the above and other objects in view, the invention consists in the details of construction, and in the arrangement and combination of parts to be hereinafter more fully described and particularly pointed out in the appended claims.

In describing the invention in detail, reference will be had to the accompanying drawings, wherein like characters of reference denote corresponding parts in the several views; and in which, Figure 1 is a side elevation of the implement with the tool element shown in full lines adjusted to serve as a hoe, and in dotted lines adjusted to serve as a spade; Fig. 2, an enlarged longitudinal section of the tool supporting end of the handle with the tool element adjusted to serve as a hoe; Fig. 3, a view similar to Fig. 2 with the tool element adjusted to serve as a spade; Fig. 4, a section taken on the line 4—4 of Fig. 2; Fig. 5, a longitudinal section through the rake head carried by the implement; and Fig. 6, a plan view of what is shown in Fig. 3.

Referring to the drawings, the implement is shown as comprising a handle 10, one end of which is enlarged and forked so as to form spaced arms 11 and 12. Disposed transversely of the handle and secured to one side of the arms 11 and 12 at their outer ends is a bar 13 which forms the rake head of the implement. This bar is provided with a plurality of transverse openings 14 in one end of each of which is fixed a nut 15. Extending through each of the openings 14 and detachably engaging with the nuts 15 are a plurality of rake teeth 16. An adjustable tool element 17 has its shank 18 pivotally mounted between the arms 11 and 12 and said element is adapted to engage the bar 13 when disposed longitudinally of the handle 10. When thus disposed, the tool element is held against rotation in one direction on its pivot by means of a locking pin 19 which is detachably mounted in and between the arms 11 and 12. When in this position the tool member is also permitted a limited movement away from the pin 19 so that it may be used to smooth or "slick" the earth by pushing on the handle. By the removal of the locking pin 19, the tool element 17 can be rotated to a position substantially at right angles to the handle 10 so as to serve as a hoe. When the tool element has been moved to a position at right angles to the handle 10, the locking pin 19 is again positioned in and between the arms 11 and 12 and prevents movement of the outer end of the tool element toward the bar 13 when the former is utilized as a hoe by abutting the shank of said tool element.

It will be understood that in practice, modifications of the specific construction shown may be made and any suitable material and proportions may be used for the various parts without departing from the spirit of the invention.

What is claimed is:—

1. In a combination tool arranged to perform raking, hoeing or spading operations; a handle having a forked end, an earth working tool pivoted between the arms of said forked end and adapted to extend laterally from said end and to lie in substantial alinement with the handle, and a raking element carried by said fork and constituting a stop to limit the movement of the earth working tool about its pivot.

2. A combination tool including a handle having a forked end, a rake bar secured to the free ends of the fork arms and maintaining them in rigid spaced relation, a tool element provided with a shank pivoted between the arms of said fork and arranged to engage said rake bar whereby said bar constitutes a stop for the tool element in adjusted positions, said tool element being capable of disposition in a plurality of operative positions, and a locking pin to hold said tool element releasably in either of said operative positions.

In testimony whereof, I affix my signature, in presence of two witnesses.

ROY E. DAVISON.

Witnesses:
M. E. KEIFFER,
E. T. ELLISON.

Copies of this patent may be obtained for five cents each, by addressing the "Commissioner of Patents, Washington, D. C."